United States Patent Office 3,597,463
Patented Aug. 3, 1971

3,597,463
PROCESS FOR PREPARING ALKYLTHIOMETHYL SILANES
Donald J. Peterson, Cincinnati, Ohio, assignor to The Procter & Gamble Company, Cincinnati, Ohio
No Drawing. Original application Mar. 13, 1967, Ser. No. 622,419, now Patent No. 3,502,731, dated Mar. 24, 1970. Divided and this application Jan. 19, 1970, Ser. No. 4,025
Int. Cl. C07f 7/02
U.S. Cl. 260—448.2E
4 Claims

ABSTRACT OF THE DISCLOSURE (1) Alkylthiomethylmetal compounds prepared by reacting alkyl methyl sulfides with potent metalating agents, e.g., a complex between alkyllithium compounds and alkylenediamines; alkyl- or phenylsodium; or alkyl- or phenylpotassium; (2) the reactions of the alkylthiomethylmetal compounds with mono-, di-, and trihalo and pseudohaloalkyl- and arylsilanes, and (3) new compounds produced thereby containing silicon and sulfur. The organo-silicon and sulfur containing compounds are useful in the synthesis of carbon substituted organosulfur derivatives.

CROSS-REFERENCES TO RELATED APPLICATIONS

This application is a division of U.S. Pat. No. 3,502,731, issued Mar. 24, 1970, entitled Alkylthio-Methylmetal Compounds, Preparation Thereof, and Reactions Thereof, in the name of Donald J. Peterson.

BACKGROUND OF THE INVENTION

This invention relates in part to alkyl methyl sulfide derivatives. Specifically this invention relates to alkylthiomethylmetal compounds useful in the synthesis of carbon substituted organosulfur compounds. This invention also relates to methods of preparing alkylthiomethylmetal compounds, processes utilizing said compounds, and new compounds produced by said processes.

The sulfide group, or thioether linkage, is a very useful group to have in a compound. For example, the sulfide group can be readily oxidized to form the more hydrophilic sulfoxide group and/or a sulfone group and can be reacted with e.g., an alkyl halide or pseudo halide to form the corresponding sulfonium salts.

In U.S. Pat. 3,228,860, it was disclosed that a sulfoxide group would activate a hydrogen atom attached to an adjacent carbon atom sufficiently to permit the metalation of said carbon atom. Also, Corey and Seebach, J. Org. Chem., 31 4097 (1966) and Gilman and Webb J. Am. Chem. Soc., 62, 987 (1940) have reported the preparation of phenylthiomethyllithium. However, until the present invention, it had not been shown that one could metalate a carbon atom when the only activating group present in the compound to be metalated was an alkylthio group.

SUMMARY

This invention relates primarily to the discovery that it is possible to prepare alkylthiomethylmetal compounds by reacting an alkyl methyl sulfide compound having the formula:

RSCH$_3$ wherein R is a saturated alkyl group containing from 1 to 30 carbon atoms, from 0 to 10 substituent oxygen atoms replacing methylene groups in alkyl and alkylene groups, and from 0 to 2 substituents selected from the group consisting of aryl groups, alkaryl groups, and tertiary amino groups, said substituents being placed so that no aryl moiety, oxygen atom, or nitrogen atom is attached to any carbon atom which is less than three atoms removed from the sulfur atom with a metalating agent selected from the group consisting of (1) phenylsodium (2) phenylpotassium (3) alkylsodium wherein the alkyl group contains from 1 to 20 carbon atoms and is attached to the sodium through a primary carbon atom, (4) alkylpotassium wherein the alkyl group contains from 1 to 20 carbon atoms and is attached to the potassium through a primary carbon atom, and (5) a complex of an alkyllithium wherein said alkyl group contains from 1 to about 20 carbon atoms with an amino compound selected from the group consisting of compounds having the formula $(R^1)_2NR^2N(R^1)_2$ 

wherein each $R^1$ group is a saturated alkyl group containing from 1 to about 20 carbon atoms and wherein $R^2$ is a saturated alkylene group containing from 1 to 5 carbon atoms and wherein the total number of carbon atoms in said amino compound is from 5 to about 28 carbon atoms and diazabicyclo(2.2.2)octane, said reaction taking place in an inert atmosphere at a temperature of from about −60° C. to about 100° C. and in a solvent which is either an excess of the alkyl methyl sulfide or a saturated hydrocarbon containing from about 5 to about 12 carbon atoms.

The alkyl methyl sulfide compounds which react with the potent metalating agents to form the alkylthiomethylmetal compounds are characterized by the absence of any substituent aryl group, oxygen atom or nitrogen atom on either of the two carbon atoms nearest the sulfur atom in the alkyl group. It has been found, surprisingly, that a hydrogen atom in the methyl group of such a compound is sufficiently activated so that the potent metalating agents hereinbefore described can remove said hydrogen atom to form the novel alkylthiomethylmetal compounds of this invention:

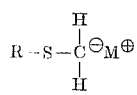

wherein M is an alkali metal, e.g., sodium, potassium, or lithium.

THE ALKYL METHYL SULFIDE

Suitable R groups include both unsubstituted saturated alkyl hydrocarbon groups and substituted alkyl groups containing, for example, oxygen substituents replacing methylene groups and substituent tertiary amino groups. Preferably, the R group in the formulas above and below is an alkyl group (straight, cyclic, or branched) containing from 1 to about 20 carbon atoms (e.g., methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups). The preferred alkyl group is methyl and the preferred alkyl methyl sulfide is dimethyl sulfide.

Examples of other saturated hydrocarbon groups include groups containing up to two substituent aryl groups, e.g., phenyl, biphenyl, or naphthyl groups and branched or straight alkyl and/or alkylene groups of from 1 to about 14 carbon atoms (e.g., 3-phenyl-dodecyl, 4-methyl, 4-phenyloctyl, 4-phenyltetradecyl, 3-(1-naphthylbutyl), 4-(1-naphthylbutyl), 3 - (4 - biphenyl)pentyl, and 3-(4-biphenyl)propyl groups.

The presence of certain relatively non-reactive groups, as hereinbefore described, in or on the R groups is permissible. As an example of relatively non-reactive substituents, the R group can contain up to about 10 oxygen atoms replacing methylene groups in alkyl or alkylene groups or up to two tertiary amino groups. Thus R can represent, for example, such groups as 4,7,10-trioxaeicosyl, 3-dodecoxypropyl, 4-octadecoxypropyl, 3-methoxypropyl, 4-ethoxybutyl, 6-hexoxyhexyl, 3-octoxyheptyl, 11-methoxyundecyl, 11-ethoxyundecyl, 9-methoxydecyl, 10-ethoxyoctadecyl, 3-methoxycyclohexyl, 3-cyclohexyloxydecyl, 4,7-dioxaheptadecyl, 3-dimethylaminopropyl, 3, 6 - di(diethylamino)-hexyl, and 3 - diethylaminopropyl groups.

(R groups, once defined, have the same definitions throughout the specification and claims.)

The preferred alkyl methyl sulfide starting compound is dimethyl sulfide because it undergoes the aforesaid reaction with remarkable facility and dimethyl sulfide is readily available.

Other preferred alkyl methyl sulfide starting compounds are alkyl methyl sulfides wherein the alkyl groups contain from 2 to about 20 carbon atoms (e.g., dodecyl methyl sulfide). For maximum yield of the alkylthiomethylmetal compounds when these long chain alkyl sulfides are used, it is desired that there be no hydrogen atom attached to the β-carbon atom on the long alkyl group. When there is a β-hydrogen atom on the long alkyl group an elimination reaction occurs giving an α-olefin as a by-product and consequently less alkylthiomethylmetal compound is formed.

There will normally be a stoichiometric amount, or an excess, of the alkyl methyl sulfide starting material relative to the metalating agent to prevent the excess metalating agent from interfering with subsequent reactions of the alkylthiomethylmetal compounds.

METALATING AGENTS

Suitable alkyllithiums for use in the metalating complex and alkylsodium and alkylpotassiums for use by themselves include those wherein the alkyl groups are methyl, ethyl, propyl, butyl, allyl, 3-dodecenyl, 8-tetradecenyl, pentyl, octyl, decyl, tetrapropylene, hexadecyl, dodecyl, octadecyl, or eicosyl groups. The unsaturated alkyl groups suitable for use in the metalating agents and in all of the reactants described hereinafter should not contain any "terminal unsaturation," i.e., the metal should not be bonded to any of the carbon atoms which comprise the center of unsaturation.

The alkyllithiums are preferably selected so that the point of attachment of the lithium is not a tertiary carbon atom since these tertiary alkyllithiums, e.g., t-butyllithium, are not readily activated by complexation with all diamines. For example, t-butyllithium will complex with diazobicyclo(2.2.2)octane. The alkylsodiums and alkylpotassiums are those that have the metal atom attached to a primary carbon atom, since the corresponding 2° and 3° organometallic compounds are difficult or impossible to prepare.

Suitable $R^1$ groups in the diamine compound of the metalating agent include methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, 2,4-hexadienyl, 2,4-dodecadienyl, 2,7-tetradecadienyl, 2,4,6-dodecatrienyl, allyl, 3-dodecenyl, 8-tetradecenyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups. The preferred $R^1$ groups are methyl and ethyl groups.

Suitable $R^2$ groups include methylene, ethylene, propylene, butylene, and pentylene groups. The preferred $R^2$ group is an ethylene group and other preferred $R^2$ groups are methylene and propylene groups. Diamines with these $R^2$ groups are very effective complexing agents.

Examples of suitable diamine complexing agents include N-methyl, N-ethyl, N'-propyl, N'-butylpropylenediamine, N-dodecyl, N,N',N'-trimethylmethylenediamine, N-octyl, N,N',N'-triethylbutylenediamine, N,N,N',N'-tetraethylpropylenediamine, and N-eicosyl, N,N',N'-trimethylethylenediamine.

The preferred diamine complexing agents are N,N,N', N'-tetramethylethylenediamine and N,N,N',N'-tetraethylethylenediamine.

The ratio of the alkyllithiums to the diamine complexing agents is normally 1:1.

The metalation reaction and other subsequent reactions must take place in an inert atmosphere of, e.g., nitrogen, argon or helium, since the organometallic compounds are so reactive that they will be destroyed if exposed to a reactive atmosphere.

The temperature of the reaction can be any temperature at which the reaction mixture is liquid, e.g., any temperature above about —60° C. The preferred temperature is room temperature, e.g. (about 20° C.) preferably; the temperature is less than about 100° C. since the organometallic compounds tend to decompose above this temperature.

Although an excess of the short chain alkyl methyl sulfides can be used as a solvent, the metalating agents normally are sold commercially with an excess of liquid saturated hydrocarbons as a solvent and it is undesirable to remove this solvent so saturated hydrocarbons are conveniently used as a solvent. Suitable liquid saturated hydrocarbons which can be used as solvents include pentane, hexane, octane, isooctane, nonane, decane, isododecane, cyclohexane, eac. Saturated hydrocarbons containing from five to eight carbon atoms are preferred since they are easily removed by distillation. Liquid saturated hydrocarbons are used since they will not undergo reaction with the organometallic compounds.

REACTIONS OF ALKYLTHIOMETHYLMETAL COMPOUNDS

REACTION WITH ORGANIC HALIDES

The alkylthiomethylmetal compounds of this invention will react with organic halides having the formula $R^3X$ wherein $R^3$ is a saturated or unsaturated alkyl group containing 1 to 30 carbon atoms, from 0 to 10 oxygen atoms substituted for methylene groups in alkyl and alkylene groups, from 0 to 5 tertiary amino group substituents, and from 0 to 2 substituents selected from the group consisting of aryl and alkaryl groups, there being no terminal unsaturation (i.e., vinylic halides) in said alkyl groups, and wherein X is a halogen atom selected from the group consisting of chlorine, bromine, and iodine.

The alkylation reaction proceeds as follows:

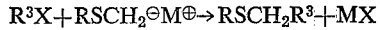

(Since the formation of the alkylthiomethylmetal compounds is accompanied by the formation of alkali metal alkyl mercaptides due to displacement and/or elimination reactions there is also an alkylation reaction as follows when the alkylthiomethylmetal compounds are used:

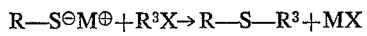

Accordingly, the alkylation reaction will normally produce a mixture of dialkyl sulfides.)

Preferred alkyl halides are those wherein the alkyl or alkenyl group contains from 1 to 20 carbon atoms. Hydrocarbon groups are preferred. Suitable alkyl groups ($R^3$) are:

Methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, butyl, butenyl, propargyl, pentyl, hexyl, octyl, decyl, undecyl, dodecyl, tetrapropylene, tetradecyl, pentadecyl, hexadecyl, octadecyl, and eicosyl groups. Suitable substituted alkyl chains include: 4,7,10,13 - tetraoxaeicosyl; 3-phenylbutyl, 4-phenylbutyl; 4-(2-naphthyl)butyl; 3 - (1-naphthylpentyl); 3 - (4-biphenyl)propyl; 3-(4-biphenyl)butyl; 3-(dimethylamino)propyl; 3,6-di(diethylamino)hexyl; and 3-dodecoxypropyl groups. Substituted alkyl groups wherein only aryl and alkaryl hydrocarbon groups are present are preferred.

Preferably, the resulting dialkyl- and substituted dialkylsulfides contain from 3 to about 30 carbon atoms.

The alkylation reactions must be carried out in an inert atmosphere and at a temperature of from about −60° C. to about 100° C. The conditions for this reaction are essentially the same as for the metalation reaction described hereinbefore. However, it is permissible to utilize more reactive solvents in this reaction. For example, one can also use ethers containing from four to 14 carbon atoms such as diethyl ether, dibutyl ether, diphenyl ether, tetrahydrofuran, 1,2-dimethoxyethane and diethylene glycol dimethyl ether.

(Except where specifically stated, all of the reactions of the alkylthiomethylmetal compounds of this invention, discussed hereinafter more fully, will take place under the same conditions as this alkylation reaction with organic halides.)

The products of these alkylation reactions are dialkyl- and substituted dialkylsulfides. These sulfides are, for the most part, known compounds. (See, e.g., Organic Chemistry of Bivalent Sulfur, E. Emmet Reid, vol. II, Chemical Publishing Co. Inc. (1960), especially pp. 78–79.) The sulfides can, of course, be oxidized to the corresponding sulfoxides and sulfones which are also known compounds and which have known utilities. (See, e.g., U.S. Pats. 2,199,989; 2,515,120; 2,702,824; 2,787,595; 2,925,442; 3,006,963; 3,231,334; and 3,045,051.) For example, when the sulfoxides contain less than about 8 carbon atoms they are excellent solvents for, e.g., interesterification reactions (see U.S. Pats. 2,812,324; 2,997,490; and 3,023,183); (see also U.S. Pats. 3,264,362; 3,280,177; 3,203,857 and 3,256,340 and Organic Sulfur Compounds, N. Kharasch, chapters 16 and 17, vol. I, Pergamon Press (1961), for other reactions utilizing sulfoxides as solvent); when the sulfoxides contain one long alkyl chain of from 8 to about 20 carbon atoms they are detergents, see, e.g., U.S. Pat. 2,787,595; sulfoxides and sulfones containing two long alkyl chains are fabric softeners for, e.g., cotton when applied in a padding bath at a level of about 1% by weight of the cloth.

The dialkyl- and substituted dialkyl sulfide products of these alkylation reactions can also be converted into the corresponding sulfonium salts by reacting said sulfide products with either a substituted or unsubstituted alkyl, or aralkyl halide or pseudo halide (e.g., methylsulfate). The corresponding sulfonium compounds are also known. (See, e.g., Reid op. cit. supra pp. 66–75, 350 and other references cited therein.) Examples of these organic halides and pseudo halides will be given hereinafter.

REACTION WITH HALO OR PSEUDO HALO ALKYL AND ARYL SILANES

The alkylthiomethylmetal compounds of this invention react with halo or pseudo halo alkyl and aryl silanes according to the followin equation:

$(R^{10})_mSiX^3_{4-m} + (4-m)RSCH_2^\ominus M^+ \rightarrow$ $(R^{10})_mSi(CH_2SR)_{4-m} + (4-m)MX^3$ wherein $R^{10}$ is an alkyl, aryl, alkaryl, or aralkyl group containing from 1 to 30 carbon atoms, from 0 to 10 oxygen atoms as substituents for methylene groups in alkyl chains, and from 0 to 5 substituent tertiary amino groups, wherein $X^3$ is a chlorine, bromine or iodine atom or a pseudo halide such as alkyl sulfate groups $R^{11}SO_4$—, an alkoxy group ($R^{11}O$—), or tertiary amino group $[R_2^{11}N-]$ wherein $R^{11}$ is an alkyl, aryl, alkaryl, and arakyl group containing from 1 to 30 carbon atoms, from 0 to 10 substituent oxygen atoms replacing methylene groups in alkyl and alkylene groups and from 0 to 5 substituent tertiary amino groups, and wherein $m$ is an integer from 1 to 3. The product of these reactions $(R^{10})_mSi(CH_2SR)_{4-m}$ are new compounds. These sulfide compounds can be converted to sulfonium salts with an organic halide or pseudo halide $R^6X^2$ as hereinbefore described. [The corresponding sulfonium compounds, e.g.,

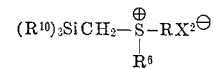

are old compounds (N. E. Miller, Inorg. Chem., 4, 1458 (1965).]

Preferred $R^{10}$ groups are a phenyl group and alkyl groups containing from 1 to 20 carbon atoms, e.g., methyl, ethyl, propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, 2,4-hexadiynyl, 2,4-dodecadiynyl, butyl, octyl, decyl, dodecyl, tridecyl, tetradecyl, pentadecyl, octadecyl, 2-octadecenyl, and eicosyl groups.

$R^{10}$ can be an aryl group (e.g. phenyl, biphenyl, or naphthyl groups); an alkaryl group (4-decylphenyl, 4-methyl-1-naphthyl, ethyldiphenyl, 2-methylphenyl, etc.); or an aralkyl group (benzyl, 12-phenyldodecyl, 1-naphthylmethyl, 2-(4-biphenyl)-ethyl, etc.) These groups are also preferred. Suitable substituted $R^9$ groups include 4-methoxyphenyl, 3,6,9,12 - tetraoxaoctadecyl, 3,6 - di(dimethylamino)hexyl, and 3-diethylaminopropyl groups.

All parts, percentages and ratios herein are by weight unless otherwise specified. The following examples are illustrative of the invention and should not be taken as limiting the scope of the claims.

EXAMPLE I

Preparation of methylthiomethyllithium 5.8 gm. (0.05 mole) of N,N,N',N'-tetramethylethylenediamine (TMEDA) was added to 36 ml. of 1.4 molar (0.05) n-butyllithium in hexane to form 0.05 mole of the n-butyllithium-TMEDA complex. (The temperature in these reactions was held below about 20° C. by means of a water bath.) 3.1 g. (0.05 mole) of dimethyl sulfide was added to the complex and after about a quarter of an hour a white precipitate had formed. This precipitate was composed of lithium methyl mercaptide and methylthiometyhllithium. After about four hours, the resulting thiomethyllithium. After about four hours, the resulting (MTML) was used in the following reactions. All reactions herein (including Examples II–XVI) were carried out in an inert atmosphere of nitrogen.

When in the above example the following alkyl methyl sulfides are substituted on a molar basis for the dimethyl sulfide, substantially equivalent results are obtained in that the corresponding alkylthiomethyllithium compounds are prepared: methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, undecyl, n-dodecyl, tetrapropylene, tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, cyclooctyl, phenyl, biphenyl, naphthyl, 3-phenyldodecyl, 4-methyldecyl, 4-phenyloctyl, 4-decyl, 4-phenylbutyl, 3-methyldecyl, 3-(1-naphthyl)propyl, 4-(1-naphthyl)butyl, 3-ethyl, 3-(4-biphenyl)propyl, and 3-(4-biphenyl)propyl methyl sulfides.

When in the above example the following metalating agents are substituted on a molar basis for n-butyllithium-TMEDA complex substantially equivalent results are obtained in that the alkylthiomethylmetal compounds are prepared: phenylsodium; phenylpotassium; methyl, ethyl, propyl, butyl, pentyl, octyl, decyl, tetrapropylene, hexadecyl, dodecyl, octadecyl, and eicosyl sodiums and potassiums; the complexes of methyl, ethyl, propyl, butyl, pentyl, octyl, decyl, tetrapropylene, hexadecyl, dodecyl, octadecyl and eicosyl lithiums with N-methyl, N-ethyl, N'-propyl, N'-butylpropylenediamine, N-dodecyl, N,N', N'-trimethylmethylenediamine, N-octyl, N,N',N'-triethylbutylenediamine, N,N,N',N' - tetraethylpropylenediamine, or N-eicosyl, N,N',N'-trimethylethylenediamine or t-butyllithium with diazabicyclo(2.2.2)-octane.

When in the above example the following saturated hydrocarbons are substituted, either wholly or in part (e.g., 1:1 mixtures), for the hexane, substantially equivalent results are obtained in that the alkylthiomethylmetal compounds are prepared: pentane, octane, isooctane, nonane, decane, isododecane, and cyclohexane.

EXAMPLE II

Reaction of MTML with chlorotrimethylsilane 0.1 mole of MTML as produced in Exmaple I was added slowly to 10.8 g. (0.1 mole) of chlorotrimethylsilane in 20 ml. of tetrahydrofuran. The reaction was mildly exothermic. The reaction mixture was heated at reflux for 0.5 hr., cooled and hydrolyzed with 200 ml. of 2 molar ammonium chloride. Separation and purification by distillation gave 7.82 g. of methyl trimethylsilylmethyl sulfide, B.P. 135° C. A $H^1$ nmr analysis gave: three singlets centered at $\tau$ (relative to internal $CHCl_3$); 7.95 ($—SCH_3$); 8.35 ($\equiv SiCH_2S—$); and 9.97 [$Si(CH_3)_3$] in the correct area ratios. 5.7 g. (0.04 mole) of methyl iodide was added to 2.68 g. of methyl trimethylsilylmethyl sulfide in 20 ml. of acetone to give 4.95 g. of the known compound dimethyl trimethylsilylmethyl sulfonium iodide, M.P. 105–107° C.

When in the above example the following haloalkyl- or arylsilanes are substituted on a molar basis for the chlorotrimethylsilane substantially equivalent results are obtained in that the corresponding silyl compounds are prepared: bromobenzylethylallylsilane; chloroeicosylcyclohexyl(2,4 - hexadiynyl)silane; 4 - dimethylaminophenyl [3 - (4 - biphenyl)propyl] (3,6,9,12 - tetraoxaoctadecyl) silane; chlorodiphenylsilane; dimethylphenylchlorosilane; dodecoxynaphthyl(3 - di - ethylaminopropyl) - 2,4 - dodecadiynyl)dichlorosilane and (diethylamino)tribromosilane.

EXAMPLE III

When in II, the following solvents are substituted, either wholly or in part (e.g., 1:1 mixture), for the tetrahydrofuran, substantially equivalent results are obtained in that the reaction proceeds without interference: pentane; hexane; octane; isooctane; nonane; decane; isododecane; cyclohexane; diethyl ether; dibutyl ether; diphenyl ether; 1,2-dimethoxyethane; and diethylene glycol dimethyl ether.

EXAMPLE VI

When in II, any of the alkylthiomethylmetal compounds of Example I are substituted for the methylthiomethyllithium or n-decylthiomethyl lithium compounds, substantially equivalent results are obtained in that analogous compounds are prepared.

What is claimed is:

1. The process of preparing silanes containing thioether linkages which comprises the step of reacting alkylthiomethylmetal compounds having the formula $RSCH_2M$ wherein R is a saturated alkyl group containing from 1 to 30 carbon atoms, from 0 to 10 substituent oxygen atoms replacing methylene groups in alkyl and alkylene groups to form ether linkages, from 0 to 2 substituents selected from the group consisting of phenyl, naphthyl, and biphenyl groups, said substituents being placed so that no aryl moiety or oxygen atom is attached to any carbon atom which is less than 3 atoms removed from the sulfur atom and wherein M is an alkali metal selected from the group consisting of lithium, sodium and potassium with silanes having the formula $$(R^{10})_m SiX^3_{4-m}$$

wherein $R^{10}$ is selected from the group consisting of phenyl groups, biphenyl groups, naphthyl groups, and alkyl groups containing from 1 to 20 carbon atoms, wherein $X^3$ is selected from the group consisting of chlorine, bromine, and iodine atoms, groups having the formula $$R^{11}O—$$

and tertiary amino groups having the formula, $$R_2^{11}N—$$

wherein $R^{11}$ is selected from the group consisting of alkyl, aryl, alkaryl, and aralkyl groups containing from 1 to 30 carbon atoms, from 0 to 10 substituent oxygen atoms replacing methylene groups in alkyl and alkylene groups and from 0 to 5 substituent tertiary amino groups and wherein $m$ is an integer from 1 to 3.

2. The process of claim 1 wherein $R^{10}$ is selected from the group consisting of a phenyl group and an alkyl group containing from 1 to 20 carbon atoms, R is an alkyl group containing from 1 to 20 carbon atoms and $X^3$ is a chlorine atom.

3. The process of claim 1 wherein R and $R^{10}$ are alkyl groups selected from the group consisting of methyl, ethyl, and propyl.

4. The process of preparing methyl trimethylsilylmethyl sulfide which comprises the step of reacting methylthiomethyllithium with chlorotrimethylsilane.

References Cited

UNITED STATES PATENTS 2,719,165   9/1955   Cooper _____ 260—448.2

OTHER REFERENCES

Eaborn: Organosilicin Compounds (1960), p. 422.

TOBIAS E. LEVOW, Primary Examiner

W. F. W. BELLAMY, Assistant Examiner

U.S. Cl. X.R.

260—448.2B, 448.2N

UNITED STATES PATENT OFFICE
CERTIFICATE OF CORRECTION

Patent No. 3,597,463          Dated August 3, 1971

Inventor(s) Donald J. Peterson

It is certified that error appears in the above-identified patent and that said Letters Patent are hereby corrected as shown below:

Column 3, line 8, "4-octadecoxypropyl" should read -- 3-octadecoxypropyl --.

Column 4, line 32, "eac." should read -- etc. --.

Column 5, line 61, "followin" should read -- following --.

Column 5, line 74, "arakyl" should read -- aralkyl --.

Column 6, lines 48 and 49 should read -- thiomethyllithium. After about four hours, the resulting reaction mixture containing the methylthiomethyllithium --.

Column 6, lines 66 and 67, "3-(1-naphthyl)proply," should read -- 3-(1-naphthyl)propyl, --.

Column 7, line 54, "EXAMPLE VI" should read -- EXAMPLE IV --.

Signed and sealed this 16th day of May 1972.

(SEAL)
Attest:

EDWARD M.FLETCHER,JR.          ROBERT GOTTSCHALK
Attesting Officer              Commissioner of Patents